| United States Patent [19] | [11] Patent Number: 4,888,996 |
|---|---|
| Rak et al. | [45] Date of Patent: Dec. 26, 1989 |

[54] DC MOTOR OPERATED VALVE REMOTE MONITORING SYSTEM

[75] Inventors: Thomas A. Rak, Marietta; T. Mark Whitaker, Hiram, both of Ga.

[73] Assignee: Movats Incorporated, Kennesaw, Ga.

[21] Appl. No.: 136,911

[22] Filed: Dec. 22, 1987

[51] Int. Cl.⁴ .......................................... G01M 19/00
[52] U.S. Cl. .................................. 73/862.19; 73/168; 73/862.33; 324/158 MG; 318/490
[58] Field of Search ................ 73/168, 862.33, 862.36, 73/116, 862.19; 364/483, 511; 318/490; 324/158 MG

[56] References Cited

U.S. PATENT DOCUMENTS

| 3,019,640 | 2/1962 | Engelmann | 73/862.19 |
|---|---|---|---|
| 3,137,163 | 6/1964 | Engelmann | 73/862.19 |
| 4,029,122 | 6/1977 | Jaegtnes | 137/551 |
| 4,123,009 | 10/1978 | Kilpinen | 241/30 |
| 4,321,529 | 3/1982 | Simmonds et al. | 324/83 R |
| 4,333,118 | 6/1982 | Comstedt et al. | 361/30 |
| 4,416,160 | 11/1983 | Sugimoto | 73/862.17 |
| 4,542,649 | 9/1985 | Charbonneau et al. | 73/168 |
| 4,570,903 | 2/1986 | Crass | 251/129.12 |
| 4,744,041 | 5/1988 | Strunk et al. | 318/490 |
| 4,787,245 | 11/1988 | Anderson et al. | 73/168 |

FOREIGN PATENT DOCUMENTS 431464  7/1975  U.S.S.R. ..................... 324/158 MG

OTHER PUBLICATIONS

"Rotating Electric Machinery and Transformer Technology", 2nd Edition, Donald V. Richardson, Reston Pub. Co. Inc., 1982, pp. 130–132, 140–144, 178–180.
Square D–Class 8430 Type G Load Converter Relays–Instruction Sheet 63080-003-01 Nov. 1983.
Square D–Product Data–Bulletin M-629 Load Monitoring For Three Phase Induction Motors–Apr., 1984.
Square D–Product News–Control Products–Load Detector And Load Converter Relays type V and G-I-C-277 Class 8430 Nov. 1983.
Movats Incorporated Letter Dated Jul. 16, 1986, to Harvey Meieran And Attached 3 page Summary.
Advertisement By Movats Incorporated Entitled "Verifying Motor Operated Valve Operability From Motor Control Center"-Distributed First About Jul., 1986.

*Primary Examiner*—Joseph A. Orsino
*Assistant Examiner*—Hollis T. Chen
*Attorney, Agent, or Firm*—Louis T. Isaf

[57] ABSTRACT

A method and apparatus for remotely monitoring the condition of a DC motor operated valve and/or valve operator by monitoring at a remote location, such as the Motor Control Center ("MCC"), the output torque of the DC motor which drives the valve operator comprises method and apparatus for monitoring the armature circuit of the DC motor at the remote location (I.E. MCC) to acquire a value of motor armature current (Ia), voltage drop across the armature (Va), and the electrical resistance of the armature (Ra); these remotely acquired electrical values of Va, Ia and Ra being utilized as input to apparatus for generating mechanical values of motor output mechanical power, armature speed, and a motor torque factor representative of the motor output torque multiplied by a constant; and the apparatus of the present invention also comprises invention circuitry for isolating the armature resistance (Ra) as a resistance value, representing that resistance value as a voltage and inputting that voltage representation of Ra into other modules of the circuitry to be used in the final generation of the DC motor torque factor; this Torque Factor being used in accordance with the present invention either: (1) alone, as a single indicator of the stem load on the valve stem of the valve operator (i.e.: by multiplying the torque factor by the known constant and also by the manufacturers' published gear efficiency values for the specific valve operator being monitored); or (2) in conjunction with other diagnostic equipment as an assist in determining the condition of the valve and/or valve operator.

33 Claims, 13 Drawing Sheets

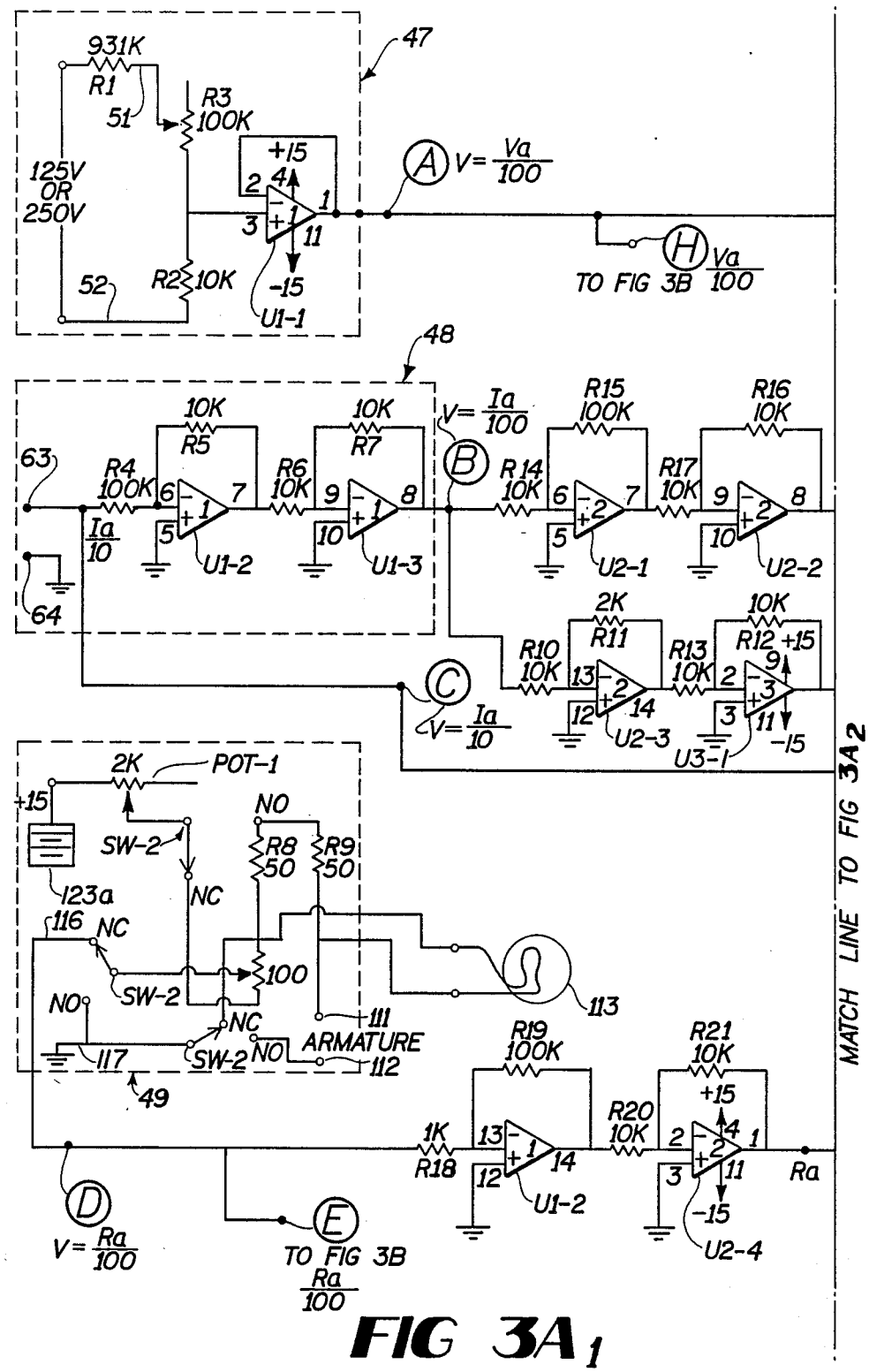
FIG 3A₁

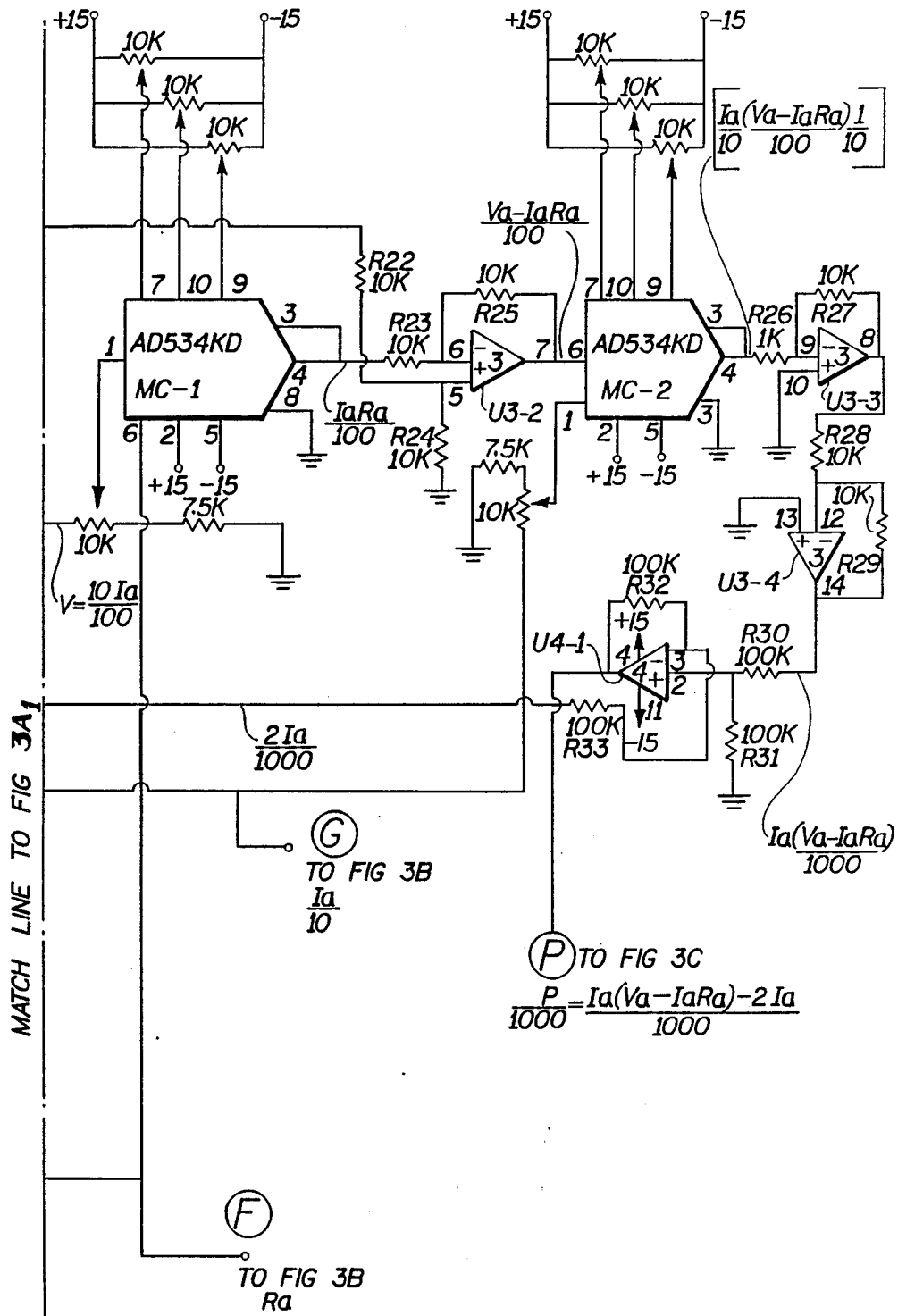
FIG 3A₂

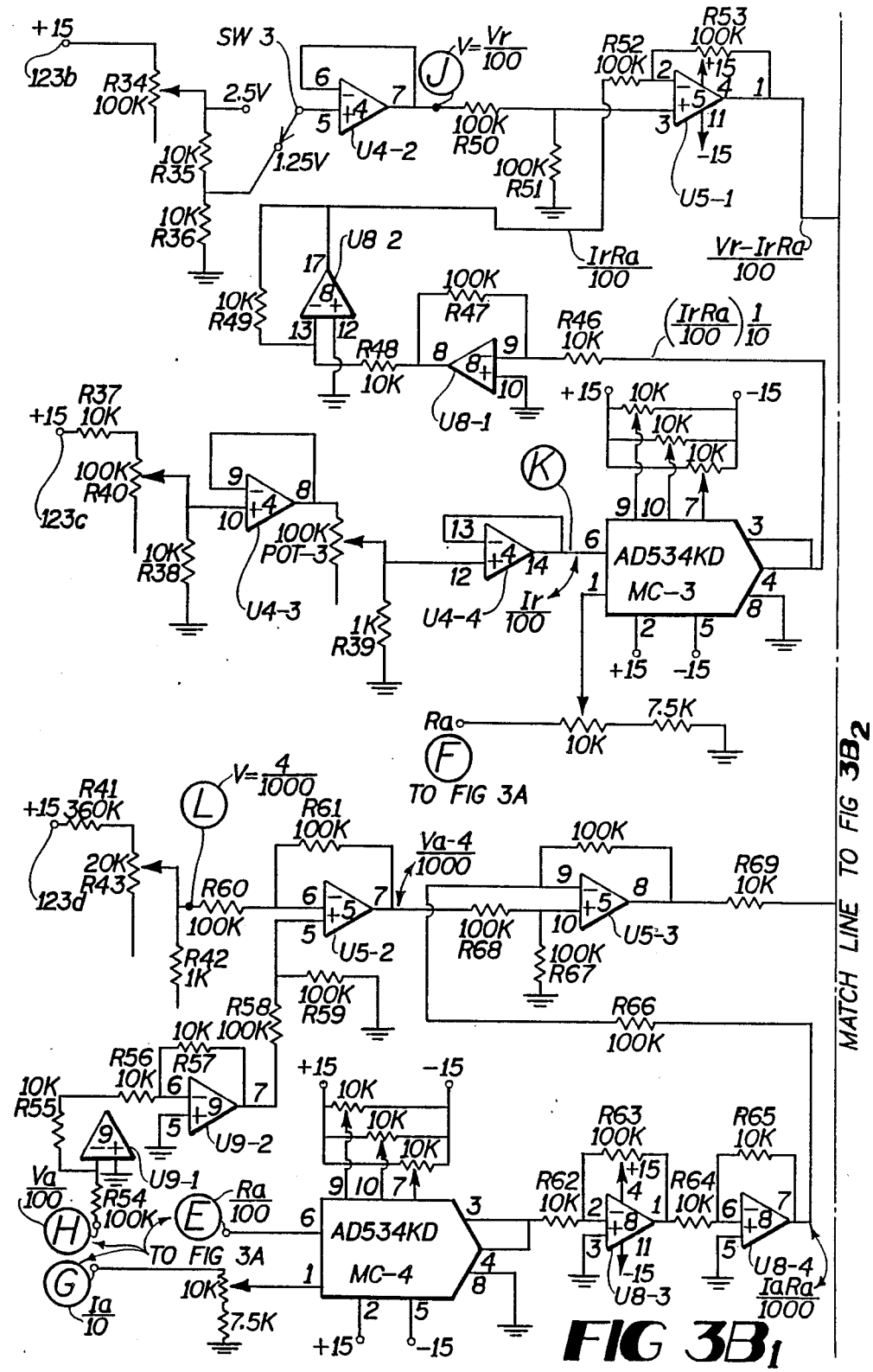
FIG 3B₁

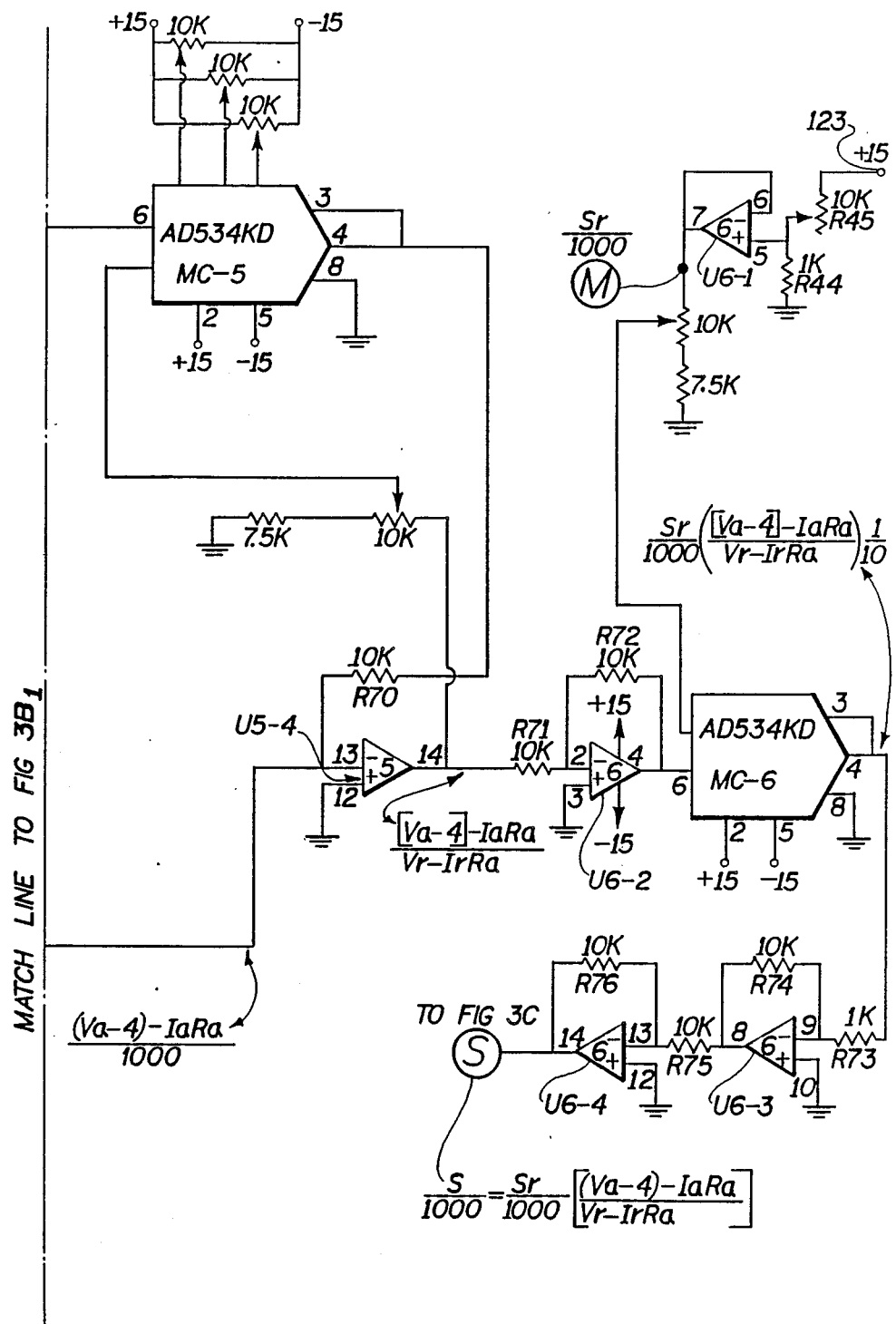
FIG 3B₂

(see: Richardson, Donald V., Rotating Electric Machinery and Transformer Technology, Second Edition, Reston Publishing Company, Inc., 1982, p. 179; © 1982 Reston Pub. Co. Inc.)

DC MOTOR OPERATED VALVE REMOTE MONITORING SYSTEM

FIELD OF THE INVENTION

This invention relates generally to the field of diagnostic monitoring of motor operated valves; and, also, to the field of monitoring and measuring mechanical and electrical parameters of a D.C. Motor.

BACKGROUND OF THE INVENTION

It has become increasingly important and necessary, especially in nuclear energy generating facilities, to provide monitoring and diagnostics of motor operated valves. Great strides have been made in the industry of valve diagnostics by Movats, Incorporated and the pioneer technology in this industry is represented by U.S. Pat. No. 4,542,649. Following the 4,542,649 patent, efforts were made to develop a method and apparatus by which at least limited diagnostics of the motor operated valve and/or valve operator could be performed from remote locations, that is, from a location which is distantly located from the actual pivotal location of the valve. Thus, Movats, Incorporated developed a method and apparatus for monitoring the motor operated valve from the motor control center ("MCC") of the power plant, which MCC is distantly located from the physical location of the valve. Prior to the present invention, this remote monitoring has been limited to accomplishments in monitoring valve operators driven by AC motors. The remote monitoring of such AC motor driven valve operators has been accomplished by monitoring power related parameters such as power factor and output power (motor load) at the MCC. Unfortunately, the exact techniques and apparatus utilized to remotely monitor AC motor operated valves does not find direct application when attempting to monitor remotely DC motor operated values. It has, therefore, become necessary to seek an effective method and apparatus for remotely monitoring DC motor operated valves which would provide reliable and consistent information at the MCC by which at least an indication of DC motor operated valve stem functioning can be provided.

SUMMARY OF THE INVENTION

Briefly described, the present invention comprises a method and apparatus for remotely monitoring the condition of a DC motor operated valve by monitoring at the remote location, such as the MCC, the output torque of the DC motor which drives the valve operator. Furthermore, this broad inventive concept of remotely monitoring the mechanical output torque of the DC motor is accomplished in accordance with the present invention through the herein disclosed, invented method and apparatus which, briefly described, comprises method and apparatus for monitoring the armature circuit of the DC motor at the remote location (i.e. MCC) to acquire a value of motor armature current (Ia), voltage drop across the armature (Va), and the electrical resistance of the armature (Ra). These remotely acquired electrical values of Va, Ia and Ra are utilized as part of the inventive method and apparatus of the present invention as input to apparatus disclosed herein for generating mechanical values of motor output mechanical power, armature speed, and a motor torque factor representative of the motor output torque multiplied by a constant.

The method of the present invention further comprises the steps of representing Va, Ia and Ra as voltage values input to and utilized within analog circuitry for generating the desired outputs of mechanical power and speed and, finally, the DC motor torque factor. The apparatus of the present invention also comprises invention circuitry for isolating the armature resistance (Ra) as a resistance value, representing that resistance value as a voltage and inputting that voltage representation of Ra into other modules of the analog circuitry to be used in the final generation of the DC motor torque factor.

This Torque Factor is used in accordance with the present invention either: (1) alone, as a single indicator of the stem load on the valve stem of the valve operator (i.e.: by multiplying the torque factor by the known constant and also by the manufacturers published gear efficiency values for the specific valve operator being monitored; or (2) in conjunction with other diagnostic equipment such as that disclosed in the Charbonneau U.S. Pat. No. 4,542,649, in which case the torque factor is calibrated to the stem load.

It is, therefore, an object of the present invention to provide a valve operator diagnostic method and apparatus for remotely monitoring the condition of a DC motor driven operator and/or valve.

Another object of the present invention is to provide a method and apparatus for generating, at a remote location, a representative value of the DC motor output torque.

Still another object of the present invention is to provide apparatus for generating values of mechanical output power and armature speed of a DC motor by monitoring of voltage, current and resistance of the DC motor.

Yet another object of the present invention is to provide an analog circuit apparatus for generating values of armature resistance, output mechanical power, armature speed and a representative factor of armature output torque for a DC motor.

Another object of the present invention is to provide method and apparatus for detecting and isolating a resistance, such as armature resistance, within a circuit and representing that resistance value as a voltage value for use in a second circuit.

Still another object of the present invention is to provide apparatus for detecting and isolating armature resistance of a DC motor and for representing the armature resistance as a voltage value for input to additional circuitry.

Another object of the present invention is to provide method and apparatus for relating DC motor parameter, or parameters, which is (are) remotely monitored, to the mechanical output of the DC motor driven valve operator for the purpose of diagnosing the condition of the valve operator and/or its associated valve.

Other objects, features and advantages of the present invention will become apparent upon reading and understanding the present specification when taken in conjunction with the accompanying drawings.

BRIEF DESCRIPTION OF THE DRAWINGS

FIG. 3A is an electrical schematic of a DC motor torque unit in accordance with the present invention, showing the power circuit and Ra, Va, Ia collecting circuits thereof.

FIG. 3B is an electrical schematic of a DC motor torque unit of the present invention, showing the speed circuit thereof.

DETAILED DESCRIPTION OF THE PREFERRED EMBODIMENT

Figure 1:
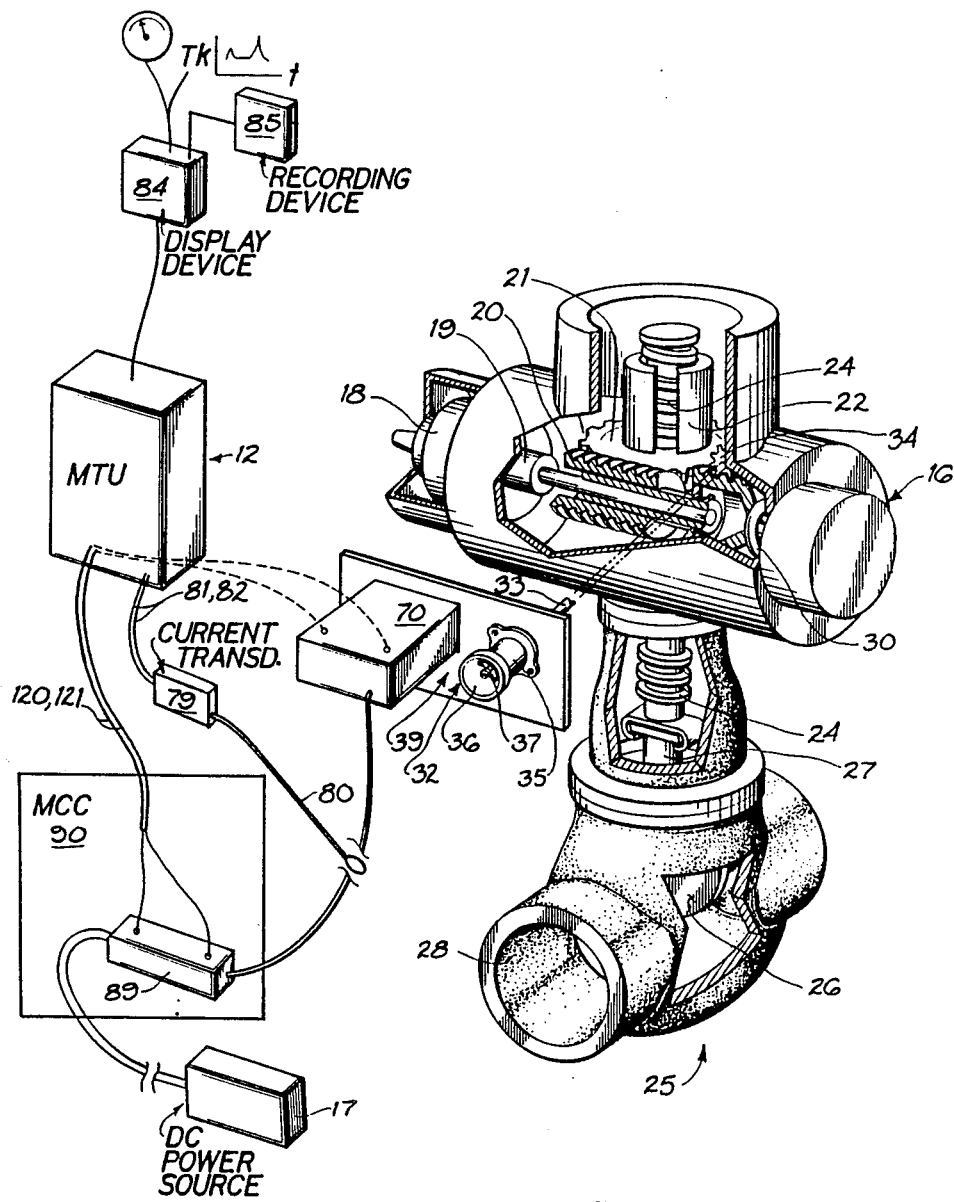
FIG. 1 is a pictorial representation, with parts broken away and parts isolated, of the DC motor operated valve remote monitoring system in accordance with the present invention.

Referring now in greater detail to the drawings, in which like numerals represent like components throughout the several views, FIG. 1 shows a preferred embodiment of the DC motor operated valve remote monitoring system 10 of the present invention, with its major component being the DC motor torque unit ("MTU") 12 and the valve operator 16. The valve operator 16 is of a type typically used in the industry (such as the nuclear power industry) and having as its main driver a DC motor 18 which receives power from a source of DC power 17. The valve operator 16 is shown as having the motor 18 which drives a worm shaft 19, which in turn drives a worm 20, which in turn drives a worm gear 22. The worm gear 21 is formed with a drive sleeve 22 into which is inserted and to which is splined a drive nut (not seen). The internally threaded drive nut drives an externally threaded valve stem 24. The valve stem 24 engages valve shaft 27 to open or close the valve element 26 of the valve assembly 25. In order to absorb the rotating inertia of a motor 18 and other operator components, a cluster of compression springs or spring pack 30 is provided at one end of the worm shaft 19. A torque switch assembly 32 is seen as connected by a post 33 to a spur gear 34 for movement in relation to the worm 20. The torque switch assembly 32 is of a type typical in the industry and generally includes a switch chamber 35 which houses an electrical/mechanical torque switch (not seen), a face plate 36 and switch setting screw 37 at the face plate.

The valve assembly 25 which is operated on by the disclosed embodiment of the present invention is a gate valve of the type typically known in the industry. The gate valve assembly 25 includes a gate element 26 which is moved up and down perpendicular to the fluid flow through the piping 28.

DC Power is provided from the DC power source 17 to a master control terminal 89 within the master control center 90 of the power plant; then to the operator terminal 70 within the control box 39 of the operator 16, and then to the motor 18.

Figure 2A:
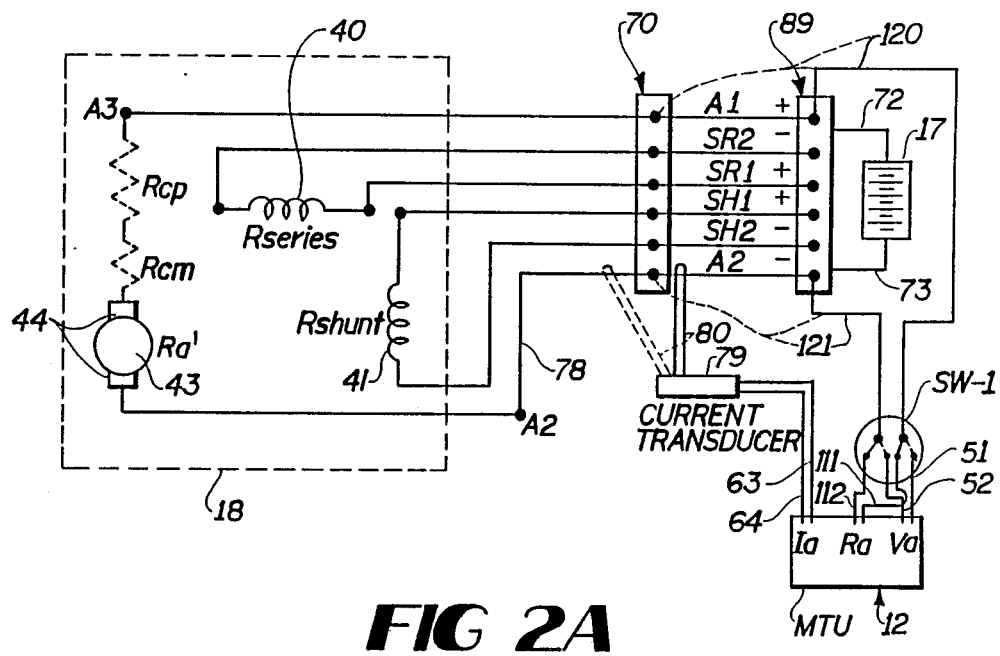
FIG. 2A is a schematic representation of the overall electrical wiring for the DC motor operated valve remote monitoring system of FIG. 1, showing a first DC motor type.
Figure 2B:
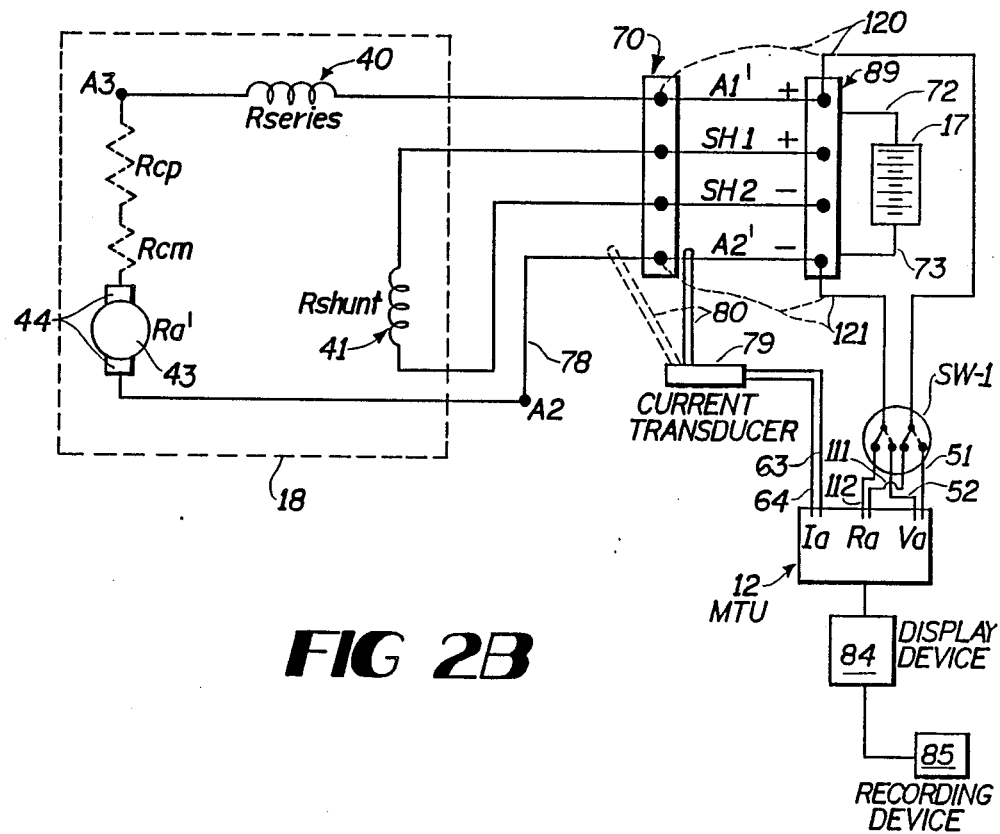
FIG. 2B is a schematic representation of the overall electrical wiring for the DC motor operated valve remote monitoring system of FIG. I, showing a second DC motor type.

The DC motor 18 of the valve operator 16 discussed in the disclosed drawings is a compound motor and representative wiring diagrams of two typical examples of compound motors are seen in FIGS. 2A and 2B. With reference to the representative wiring diagrams of FIGS. 2A and 2B, the major motor 18 components are seen as the series field inductance 40, shunt field inductance 41, armature 43 and commutator brushes 44. FIG. 2A shows an example DC motor 18 which has six separate power connections, two connections for each of the armature circuit (A1, A2), series field (SR1, SR2) and shunt field (SH1, SH2). FIG. 2B shows an example DC motor 1G in which the series field inductance 40 lies within the same circuit as the armature 43 and thus, there are only four power connections, two for the combined armature/series field circuit (A1', A2') and two for the shunt field (SH1, SH2). The term Armature Circuit as used hereafter shall refer to the circuit in which the armature 43 is found. For example, the Armature Circuit of FIG. 2A is the circuit between terminals A1 and A2; the Armature Circuit of FIG. 2B is the circuit between terminals A1' and A2'. Further description and explanation of the components and operation of a DC motor is considered well known in the industry and, therefore, not expanded on herein unless needed for clarity of certain aspects of the present invention.

The DC motor torque unit 12 is a device constructed in accordance with the present invention to electronically represent and perform the function of analytical equations for power, speed and a torque factor (torque multiplied by aconstant). The ultimate goal of the motor torque unit 12 is to provide a torque related output which, in a preferred embodiment of the present invention, is used as a representative indicator of the load ("stem load") experienced on the valve stem 24 of the valve operator 16.

Power and speed, and thus torque, of the DC motor are capable of being expressed as functions of voltage, current and resistance. In accordance with the present invention, the motor torque unit 12 capitalizes upon this ability by taking remote measurements of voltage, current and resistance to monitor the power, speed and torque of the motor 18. Thus, one aspect of the present invention is to remotely monitor a Torque Factor which is defined as the mechanical output torque of the motor armature 43 multiplied by a constant ("k") in order to relate that Torque factor, or a resultant calculated motor output torque, to the stem load. The DC motor torque unit 12 of the herein discussed embodiment represents one acceptable, and indeed preferred method and apparatus of accomplishing this aspect of the present invention. For purposes of the present invention it is accepted that DC motor mechanical output torque is a function of mechanical output power and the armature mechanical rotational speed as represented by the following equation:

$$Tk = \frac{Power}{Speed} = \frac{P}{S} \quad \text{(Eq. 1)}$$

Wherein: T=Torque
Tk=Torque Factor

Figure 5:
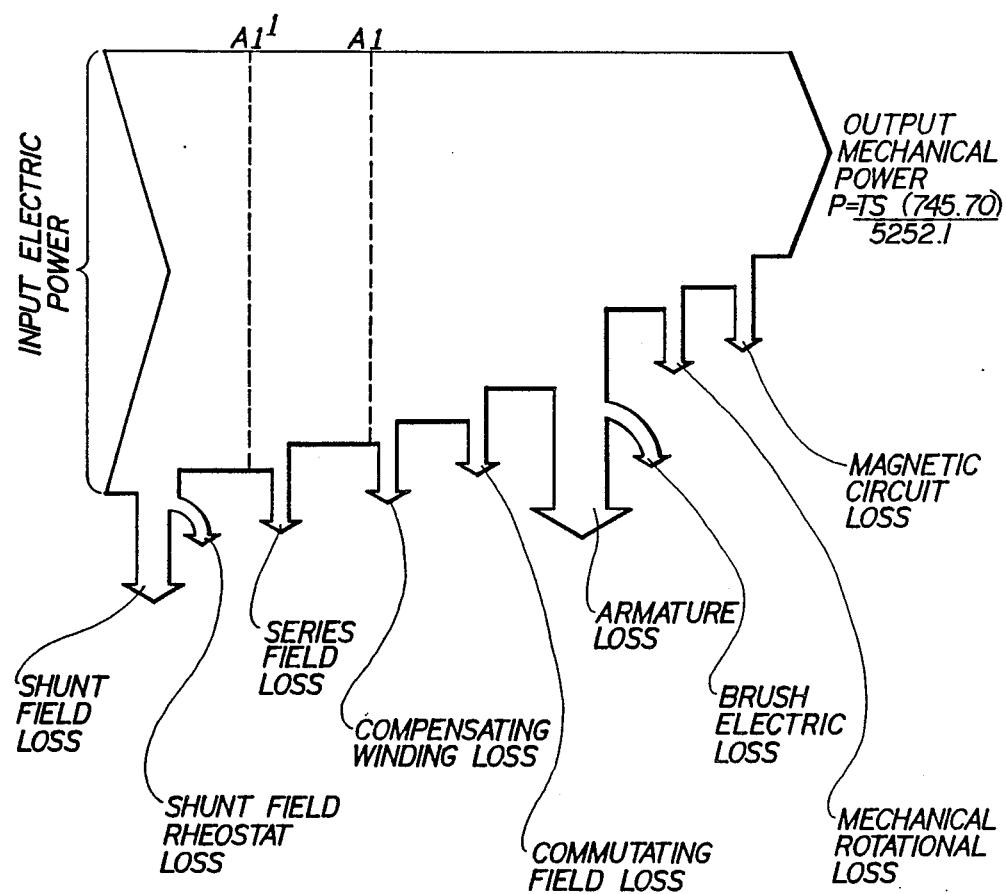
FIG. 5 is a diagrammatic representation of power input, power losses and power output of a typical DC motor.

The function of the DC motor torque unit 12 is to monitor voltage, current and resistance to thus compute power and speed and ultimately the Torque Factor. In accordance with the preferred embodiment of the present invention, certain assumptions and preliminary steps are made for purposes of computing power, speed and Torque Factor:

Assumption 1—It is assumed as accepted that mechanical output power of a typical DC motor 18 is equal to the motor input power minus the internal motor (efficiency) losses. Power losses in a typical DC motor 18 are assumed to be as depicted in FIG. 5. In motors 18 in which a certain field winding is not present, that particular type of loss is not involved.

Assumption 2—With reference to FIG. 5, the mechanical rotation losses are assumed to be mechanical losses within the operator itself (and are themselves diagnosed by the present invention).

Assumption 3—With reference to FIG. 5, the magnetic circuit losses are assumed to be negligible (thus, zero).

Step 1—With reference to FIGS. 2A and 5, it is seen that, in accordance with one preferred embodiment of the present invention, measurements for voltage and resistance utilized by the Motor Torque Unit 12 are taken across terminals A1 and A2; thus avoiding the shunt field and the series field, and eliminating shunt field, shunt field rheostat and series field loss from consideration.

Step 2—With reference to FIGS. 2B and 5, it is seen that, in accordance with the alternate arrangement of the preferred embodiment shown in FIG. 2B of the present invention, measurements for voltage and resistance utilized by the Motor Torque Unit 12 are taken across terminal A1' and A2' thus avoiding the shunt field, and eliminating shunt field and shunt field rheostat losses from consideration.

Assumption 4—It is assumed that commutating field resistance (Rcm), if any, and compensating winding resistance Rcp), if any, are within the armature circuit between points A3 and A2, together with the armature resistance (Ra').

Step 3—Based on Assumptions 1-4 and Steps 1 and/or 2, an acceptable representative function of Power (P), for the preferred embodiment of the present invention is chosen as $$P = VaIa - Ia^2Ra - 2Ia \quad \text{(Eq. 2)}$$

$$P = Ia(Va - IaRa) - 2Ia$$

wherein:
Ia=armature current
Ra=Resistance within the Armature Circuit between points A1 and A2 of FIG. 2A; or between points A1' and A2' of FIG. 2B. Thus, Ra (FIG. 2A)=Ra'+(Rcp+Rcm, if present); Ra (FIG. 2B)=Ra'+Rseries+(Rcp+Rcm, if present)
Va=Bus voltage (i.e. across the armature circuit)
2 Ia=Brush electric loss Step 4—An acceptable representative function of armature speed (S), for the preferred embodiment of the present invention, is chosen as:

$$S = Sr \frac{[(Va - 4) - IaRa]}{Vr - IrRa} \quad \text{(Eq. 3)}$$

Wherein:
Sr=name plate rated speed for specific DC motor 18
Ir=name plate rated current for that motor 18
Vr=name plate rated voltage for that Motor 18
Va, Ia, Ra are as defined in Step 5, above
"4"—represents a standardized, assumed, 4 volt voltage drop across the armature brushes.

The foregoing Assumptions 1-4 and Steps 1-4 are made as part of the preferred method and apparatus of the present invention in an effort to acquire representative functions of power and speed which are expressible in terms of electrical parameters ( V.I.R), which are collectable at a location remote to the valve operator: The invention is not to be limited in scope by these Assumptions or Steps. Rather, other embodiments of the present invention which utilize varying representative functions of power or speed, expressed in terms of V,I and R, are acceptable.

Figure 3C:
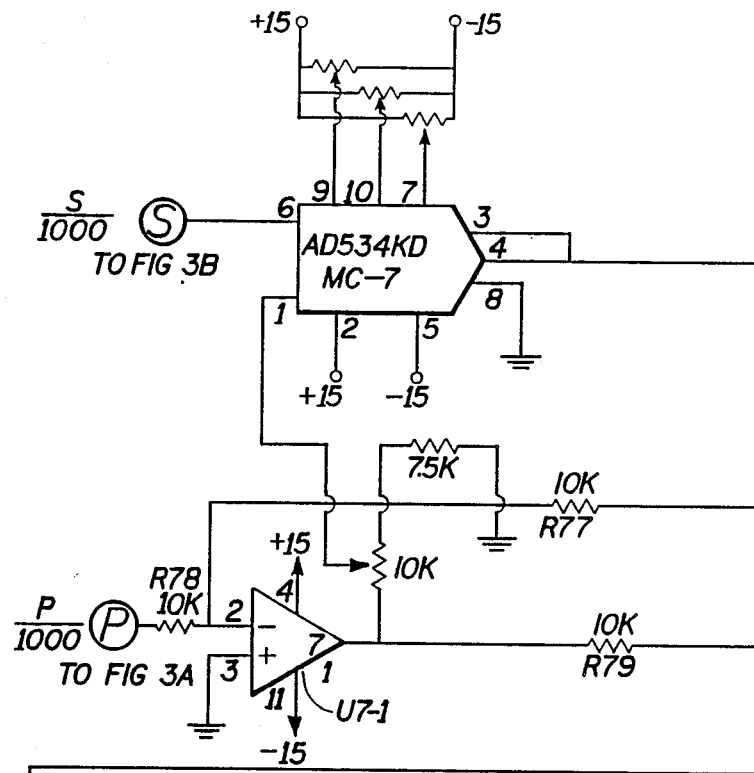
FIG. 3C is an electrical schematic of a DC motor torque unit in accordance with the present invention, showing the torque circuit thereof.
Figure 3C:
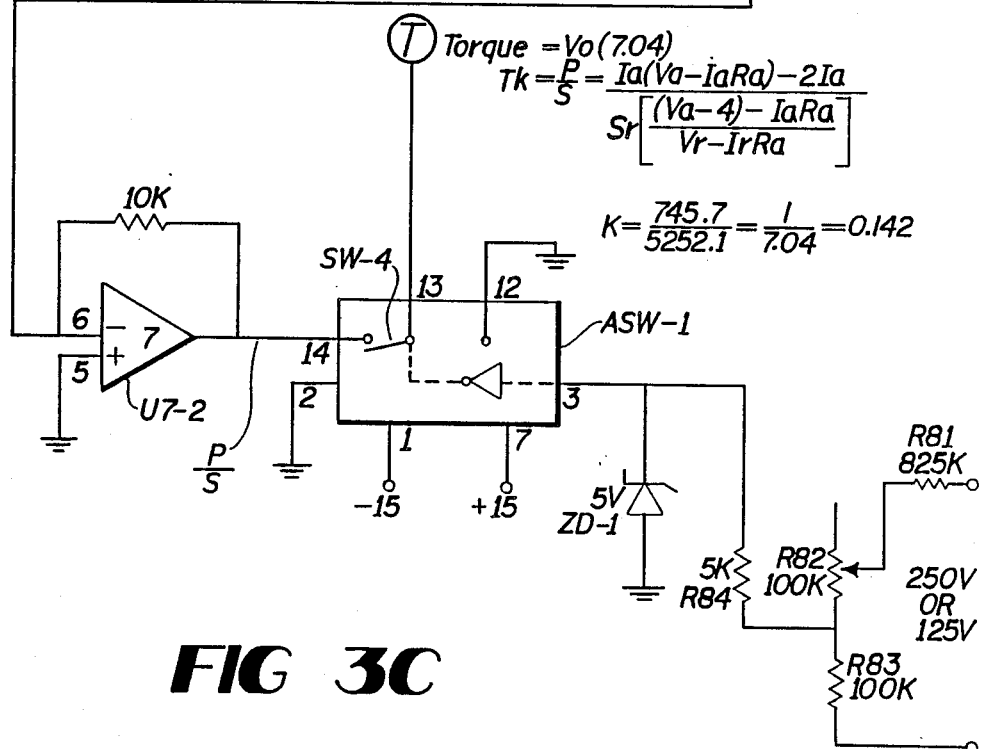

Turning to the herein disclosed preferred embodiment, the DC motor torque unit 12 is shown in schematic form in FIGS. 3A, 3B, and 3C. For ease of description, the circuitry of the motor torque unit 12 has been broken into three circuit components: the power circuit seen in FIG. 3A; the speed circuit seen in FIG. 3B; and the torque circuit seen in FIG. 3C. The power circuit of FIG. 3A is analog electronic circuitry which represents and performs the analytical functions of the power equation (Eq. 2) above. The speed circuit of FIG. 3B is an analog electronic circuit which represents and performs the analytical functions of the speed equation (Eq. 3) above. The torque circuit of FIG. 3C is analog electronic circuitry representing and performing the analytical functions of the Torque Factor equation (Eq. 1) above and incorporating the output from the power circuit (FIG. 3A) and speed circuit (FIG. 3C).

Referring to FIG. 3A, the motor torque unit 12 comprises three parameter collecting circuits, which are the "Va collecting circuit" 47, "Ia collecting circuit" 48 and "Ra collecting circuit" 49. The Va collecting circuit 47 monitors the armature circuit voltage (Va) by connecting Va collecting circuit lead wires 51 and 52 to the motor armature circuit terminals A1, A2 (A1', A2'). In the disclosed embodiment of FIGS. 2A and 2B, a switch (SW−1) is utilized to alternately place the Va collecting circuit 47 and Ra collecting circuit 49 in connection with the armature circuit terminals, by jumpers 120, 121, as discussed more fully below. The Va collecting circuit 47 is seen as including a voltage divider comprising resistors R1 and R2 and variable resistor R3, and a buffer U1-1. Output from this Va collecting circuit 47 is the Va utilized by the power circuit and speed circuit. Through action of the voltage divider of the Va collecting circuit 47, a voltage output at point A is a scaled down line voltage equivalent to 1/100 of the actual armature circuit voltage (that is, Va/100).

The Ia collecting circuit 48 includes a current transducer 79 of the type known in the industry as a voltage varying amp probe which generates an output signal of varying voltage in response to a varying current detected by the current transducer. An acceptable current transducer 79 performing the desired function in accordance with the preferred embodiment of present invention is that device known as a FLUKE Model Y8100 current probe; which current transducer 79 is installed with its current probe 80 clamped about the armature 43 output wire 78, and the output lead 81, 82 of the current transducer connected to the current representing input leads 63, 64 of the motor torque unit 12; and which current transducer 79 is operated in accordance with the manufacturer's instructions. It is a characteristic of the current transducer 79 that the current transducer's current representing voltage output is scaled by a factor of 1/10. Thus, the voltage input at Ia input lead 63 from the current transducer 79 is representative of Ia/10. The Ia collecting circuit 48 also includes resistors R4, R5, R6 and R7, a voltage reducing amplifier chip U1-2 and inverter chip U1-3 to further scale the current representing voltage, whereby the resultant output signal provided by the Ia collecting circuit at point B is in the ratio of Ia/100. It is also noted that the current representing voltage output from the Ia collecting circuit at point C is in the ratio of Ia/10.

Figure 4A:
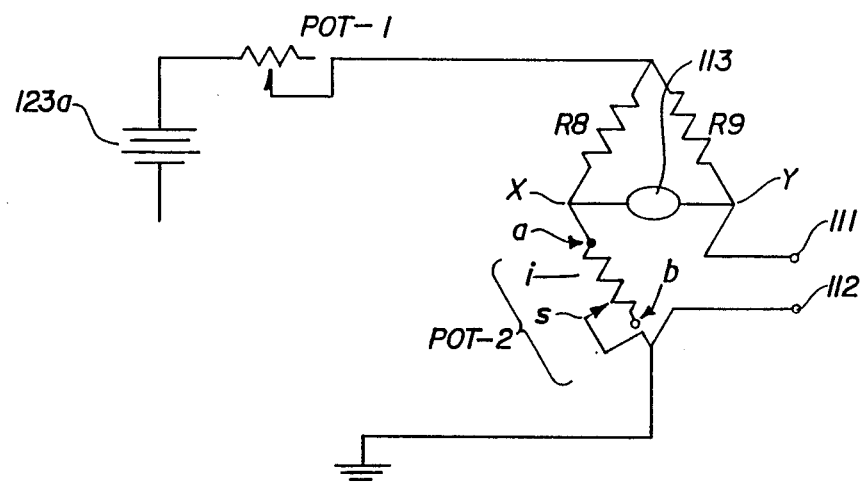
FIG. 4A is an isolated, schematic representation of the armature resistance tuning circuit of the Ra collecting circuit of the DC motor torque unit of FIG. 3A.
Figure 4B:
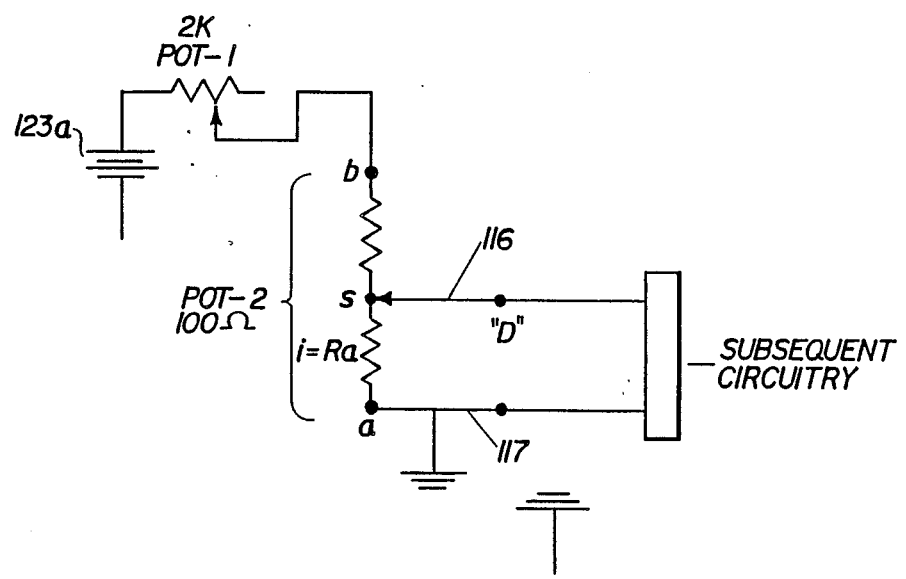
FIG. 4B is an isolated, schematic representation of the armature resistance voltage supplying circuit of the Ra collecting circuit of the DC Motor Torque Unit of FIG. 3A.

The Ra collecting circuit 49 is seen in FIG. 3A and in FIGS. 4A and 4B as comprising two sub-circuits relating to one another through a switch SW-2. The first sub-circuit (isolated in FIG. 4A) shall be referred to as the armature resistance tuning circuit and includes a secondary voltage source 123a, potentiometer "Pot-1", resistors R8 and R9, potentiometer "Pot-2", armature resistance connecting leads 111, 112 and a lamp 113. The second sub-circuit of the Ra collecting circuit 49 (isolated in FIG. 4B) shall be referred to as the Armature Resistance Voltage Supply Circuit and comprises the secondary voltage source 123a, potentiometer "Pot-1", potentiometer "Pot-2" and Ra supply leads 116, 117. With reference to the drawings, it can be seen that potentiometer "Pot-2" is placed alternately within the tuning circuit and the voltage supply circuit by action of switch SW-2. The function of the Ra collecting circuit 49 is to detect and isolate a resistance at the potentiometer "Pot-2" which is equal to a resistance connected across the resistance connecting leads 111 and 112, and to then represent this isolated resistance as a voltage for output along the Ra supply lead 116 for use in the power circuit (remainder of FIG. 3A) and the speed circuit (FIG. 3B). It is noteworthy and important that the Ra collecting circuit 49 finds independent usefullness outside of the specific application within the motor torque unit 12 and defines application in other environments where it may be necessary to detect and isolate a resistance and then represent that isolated resistance as a voltage for use in subsequent circuitry. In accordance with the preferred, herein disclosed embodiment of the present invention, the resistance sought to be detected, isolated and represented as a voltage is the armature resistance Ra which comprises the resistance within the Armature Circuit.

With reference to FIGS. 2A and 2B, it is seen that the armature resistance leads 111, 112 are connected at switch SW-1 to jumpers 120, 121 which are connected, as by alligator clips, to the master control terminal 89 at the MCC or to the operator terminal 70 at the operator control box 39. In this way, the armature resistance Ra is placed within the tuning circuit of the Ra collecting circuit 49. The tuning circuit (FIG. 4A) of the Ra collecting circuit functions on the principal of a Wheatstone Bridge; and, thus, resistors R8 and R9 are. of equal value and potentiometer "Pot-2" is "tuned" until the lamp 113, acting as an indicator of "0" volts across the bridge points "X" and "Y", goes out. Whenthevoltageat lamp 113 is "0", the Resistance ("i") at "Pot-2" is equal to Ra and, thus, Ra has been detected at "Pot-2" and the resistance equal to Ra has been isolated as the effective Resistance "i" of Pot-2, isolated between points "a" and sliding contact "s" of Pot-2. After this process has been accomplished to detect and isolate a resistance equivalent to Ra at Pot-2, switch SW-2 is thrown from the "NO" to the "NC" position whereby Pot-2 is placed within the voltage supply circuit diagrammed in FIG. 4B. It can be seen in FIG. 4B that the voltage supply circuit now places subsequent analog circuitry between point "D" and ground, in parallel with the isolated resistance "i" (Ra). Thus, voltage potential in the subsequent circuitry is equal to the voltage drop across the isolated resistance"i" of Pot-2. As seen in FIG. 4B, Pot-2 is in series with Pot-1 and the secondary voltage source 123a. In the preferred embodiment, the values of secondary voltage source 123a, Pot-1 and Pot-2 are chosen or the expressed purpose of acquiring a voltage output at point "D" established by the ratio of one ohm of isolated resistance "i" is equal to one millivolt at point "D". In the herein disclosed embodiment, the secondary voltage source is 15 volts, Pot-2 is 100 ohms and Pot-1 is varied to give a 1 milliamp current across Pot-2 (i.e. Pot-1 is adjusted to 1400 ohms in the stated example) thus, as a result of the function of the Ra collecting circuit 49, a voltage is provided at point "D" of the motor torque unit circuitry which represents the armature circuit resistance Ra in a scaled down ratio. That is, at point "D", V=Ra/100.

Referring now again to FIG. 3A, the above described, scaled values of Va, Ia and Ra are input to the power circuit through various buffers, amplifiers, inverters, multipliers, differential amplifiers and dividers which act upon the various signals to provide a resultant output at point "P" representative of the function of the power equation (eq. 2) above. In the preferred embodiment, the power circuit of FIG. 3A includes the following functional combinations which result in the signal modifications (intermediate outputs) as indicated on the drawings: an amplifier combination including resistors R14 and R15 and amplifier chip U2-1; the inverter combination of R16 and R17 and op-amp U2-2; voltage reducing amplifier combination including resistors R10 and R11 and amplifier chip U2-3; inverter combination of resistors R12 and R13 and op-amp U3-1; amplifier combination of resistors R18 and R19 and amplifier chip U1-2; inverter combination of resistors R20 and R21 and op-amp U2-4; multiplier combination including multiplier chip MC-1 and accompanying circuitry as dictated by its manufacturer, differential amplifier combination of resistors R22, R23, R24 and R25 and diff-amp U3-2; multiplier combination including multiplier chip MC-2 and accompanying circuitry as dictated by its manufacturer, amplifier combination including resistors R26 and R27 and amplifier chip U3-3; inverter combination of resistors R28 and R29 and op-amp U3-4; and differential amplifier combination including resistors R30, R31, R32 and R33 and diff-amp U4-1. As shown, the resultant representative function at point "P" is scaled to P/1000.

Referring now to FIG. 3B, the Speed Circuit of the preferred embodiment is constructed to provide a resultant voltage output at point "S" representative of the function of the speed equation (Eq. 3) above. In the preferred embodiment, the speed circuit of FIG. 3B includes the below described functional combinations which result in the signal generation and signal modifications as indicated on the drawings.

The speed Circuit of FIG. 3B includes a first voltage divider combination including a secondary voltage source 123b, variable resistor R34, resistors R35 and R36, switch SW-3 and buffer op-amp U4-2. This first voltage divider combination generates a voltage in the Speed Circuit representative of the rated, name plate voltage (Vr) of the specific motor 18 being tested. The variable resistor R34 and switch SW-3 assist in the relative voltage representation and the resultant output from the buffer U4-2 is a scaled representation of Vr, where the output voltage from the first voltage divider, at point J, is equal to Vr/100. Thus, by way of example only, Vr for a Limitorque Corporation SMB-0 operator is 125 volts and the generated voltage signal at point J is 1.25 volts.

A second voltage divider and buffer combination including secondary power source 123c, resistors R37, R38, R39 and variable resistor R40, op-amps U4-3 and U4-4, and potentiometer "Pot-3" generates a voltage representation of the rated, name plate current (Ir) scaled to the relationship of one volt equals 1/100 amps. That is, the output voltage from the second voltage divider, at point K, is equal to Ir/100. By way of example only, Ir for a Limitorque Corporation SMB-0 operator is 9.6 amps and the generated voltage signal at point K is 0.096 volts. A third voltage divider combination includes secondary voltage source 123d, resistors R41 and R42 and variable resistor R43; the purpose of this divider being to create a voltage representation of the voltage drop across the armature of the brushes. For purposes of the disclosed circuit, the brush voltage drop is assumed to be 4 volts and the representative output from this voltage divider is seen, at point L, to be a scaled representation of 4/1000. A fourth voltage divider combination is seen in the upper right side of FIG. 3B and includes both secondary voltage source 123e, resistor R44 and variable resistor R45 and buffer U6-1. This voltage divider combination creates a voltage representation of the rated, name plate speed (Sr) for the subject motor 18. By adjusting the variable resistor R46 Sr is represented and scaled to the ratio of Sr/1000. Thus, by way of example only, Sr for a Limitorgue Corporation SMB-0 operator is 1900 rpm and the generated voltage signal at point M is 1.90 volts.

Having created representative voltages for Vr, Ir and Sr within the speed circuit of FIG. 3B, at points J, K and M voltages representing Ra. Va and Ia are introduced into the speed circuit at points E, F, G and H as shown. It is noted that voltage input at point "F" is a one-to-one representation of Ra (that is V=Ra). The other voltage inputs from the Ia, Va, Ra collecting circuits are scaled such that at point "H", V=Va/100; at point "E", V=Ra/100; and at point "G", V=Ia/10. The speed circuit acts upon the representative voltages of the Vr, Ir, Sr, Va, Ia and Ra through the use of resistors, op-amps, multipliers and dividers to product the resultant, representative function of speed at point "S". As shown, the resultant, representative function at point "S" is scaled to S/1000. The following element combinations act upon the representative voltages to acquire output at point "S" representative of the respective speed function in the indicated scaled relationship of S/1000: multiplier combination including multiplier chip MC-3 and its accompanying circuit element as recommended by its manufacturer; amplifier combination including resistors R46 and R47 and amplifier chip U8-1; inverter combination including resistors R48 and R49 and inverter chip U8-2; differential amplifier combination including resistors R50, R51, R52 and R53 and diff-amp U5-1; the voltage reducing amplifier and inverter combination including resistors R54 and R55 and reducing amplifier chip U9-1, and resistors R56 and R57 and inverter chip U9-2; differential amplifier combination including resistors R58, R59, R60 and R61 and differential amplifier chip U5-2; multiplier combination including multiplier chip MC-4 and accompanying circuitry as dictated by its manufacturer; amplifier and inverter combination including resistors R62 and R63 and amplifier U8-3 and resistors R64 and R65 and inverter U8-4; differential amplifier combination including resistors R66, R67 and R68 and differential amplifier U5-3; voltage dividing combination including multiplier (divider) chip MC-5 with accompanying manufacturer's recommended circuit elements and resistors R69 and R70 and op-amp U5-4; voltage reducing amplifier combination including resistors R71 and R72 and amplifier U6-2; multiplier combination including multiplier chip MC-6 with its accompanying, manufacturer's recommended circuit elements; amplifier and inverter combination including resistors R73 and R74 and amplifier U6-3, and resistors R75 and R76 and op-amp U6-4.

It is now seen that the circuit voltage leaving the power circuit of FIG. 3A at point "P" is representative of the therein stated function of Power, scaled to a ratio of P/1000 and the voltage output at point "S" of the speed circuit of FIG. 3B is representative of the therein stated function for armature Speed in the scaled ratio of S/1000. Voltages from points "S" and "P" are then carried to the torque circuit of FIG. 3C where the voltages are acted upon by the circuitry to give a final Torque Factor ("Tk") represented by the following function:

$$Tk = \frac{P}{S} = \frac{Ia(Va - IaRA) - 2Ia}{Sr\left[\frac{(Va - 4) - IaRa}{Vr - IrRa}\right]}$$

The representative voltages in the torque circuit of FIG. 3C are acted upon by the following combination of elements: voltage divider combination including multiplier (divider) chip MC-7 with its accompanying, manufacturer's recommended components and resistors R77 and R78 and op-amp U7-1; inverter combination including resistors R79 and R80 and inverter U7-2. The result of these analog functions is the output torque factor at point"T". The torque circuit output is seen as being controlled by an analog switch ASW-1. When the tested motor 18 is not running, the motor torque unit 12, absent switch ASW-1, continues to try to perform its functions, including the function of dividing P/S. This results in dividing by zero and generating output of infinity. Therefore, switch ASW-1 ties the output point "T" to ground at pin 12 when the motor 18 is not running. Once voltage is applied to the armature (as represented by voltage across terminals A2 and A1 of FIG. 2), enabling voltage is applied to pin 3 of switch ASW-1 thus throwing the switch SW-4 to pin 14, and connecting the output point "T" to the torque circuit. The resistors R81, R82 and R83 are part of a voltage dividing circuit. Resistor R84 and zenor diode ZD-1 are part of a zenor regulator circuit.

The scaling accomplished throughout the circuits of FIGS. 3A, 3B and 3C is performed to keep the circuit voltages within the capabilities of the electronic chip components, and, in certain instances to compensate for natural reduction amplification of the selected multiplier chips (ie. MC-1, M-C2). The values of the various resistors utilized in the herein disclosed example of the preferred embodiment are shown on the drawing figures. In the herein disclosed example, the nine quad-op-amps (U1-49) are all of a type known in the industry such as ECG Semiconductor part number ECG 987; the seven multiplier chips (MC1-MC7) are all of a type known in the industry such as Analog Devices, part number AD534KD. An acceptable example of the analog switch ASW-1 is that made by Analog Devices part number AD 7512. The scope of the invention is not to be limited by the disclosed circuitry nor by the stated example components or values.

Figure 6:
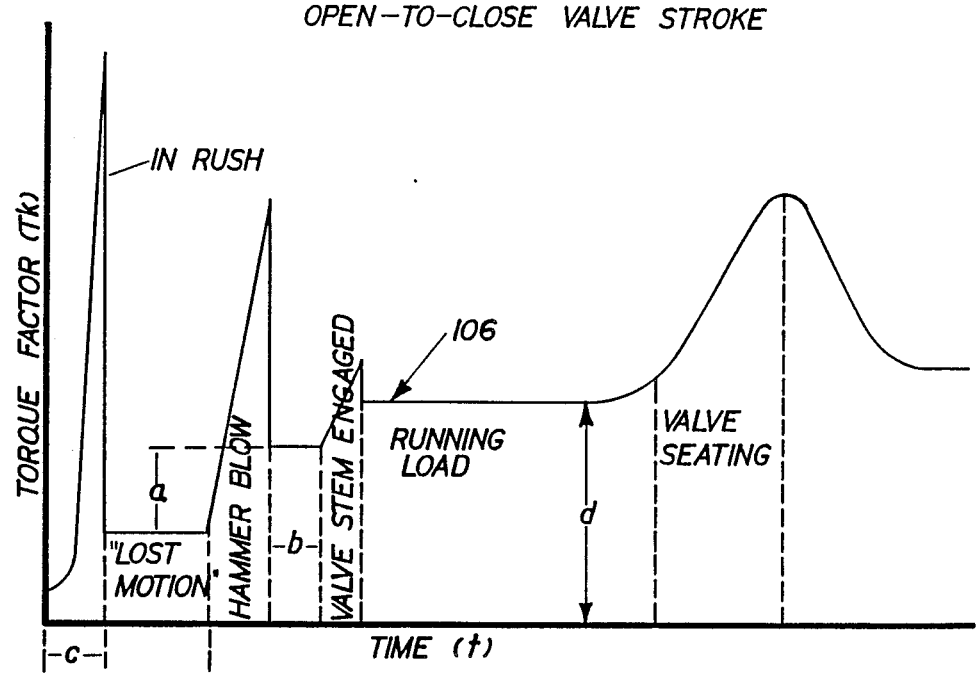
FIGS. 6 and 6a are a graph displaying a motor Torque Factor vs Time curve generated in accordance with the method of the present invention.

Having received a voltage at point "T" representative of the Torque Factor, ("Tk") the Torque Factor output is, according to the preferred embodiment of the present invention, directed to a display device 84 and/or to a recording device 85. An example of such a device is an oscilloscope such as the NICOLET 3091 which both displays and records the resultant Torque Factor output. Furthermore, in preferred embodiments, a time related trace of the Torque Factor is maintained at the display and/or recording device 84, 85. An example of such a trace of the Torque Factor over time taken during the valve closing cycle of an operator 16 is seen in FIG. 6 as trace 106.

In the preferred embodiment, the resultant Torque Factor from the DC Motor Torque Unit 12 is utilized as an assist in performing valve diagnostics. A first method using the Torque Factor in valve diagnostics is to incorporate techniques of trending and signature analysis to analyse variations in the Torque Factor/Time Traces 106 (FIG. 6) during two or more different time periods By way of example, and without limiting the diagnostics uses of the present invention, a user is able to detect such valve problems as: deterioration in operator efficiency, for example in the gearing between motor 18 and worm gear 21, by a change in distance "a" of trace 106; degradation in the valve stem 24 and valve shaft 27 connection, by a change in the distance "b" of trace 106; variation in the time interval "c" of inrush power; and jammed, overpacked and otherwise restricted operator, by change in distance "d". Signature analysis of a time related Torque Factor trace such as trace 106 of FIG. 6 also has diagnostic value for observing such problems as (but without limitation): bent valve stem, broken gear tooth and loose stem nut.

Figure 7A:
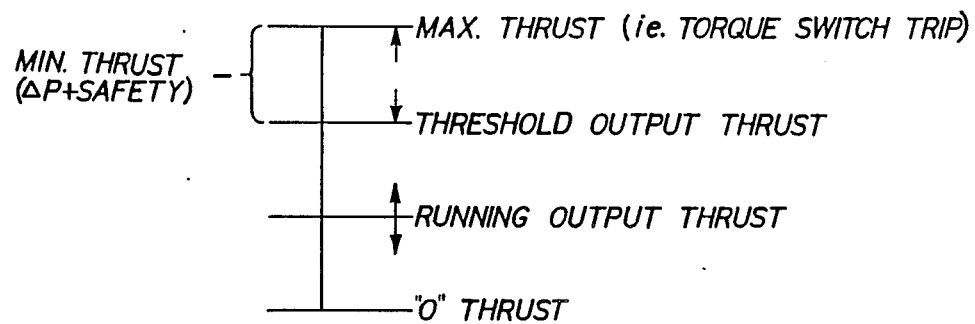
FIG. 7A is a bar representation of operator output of FIG. 7.
Figure 7:
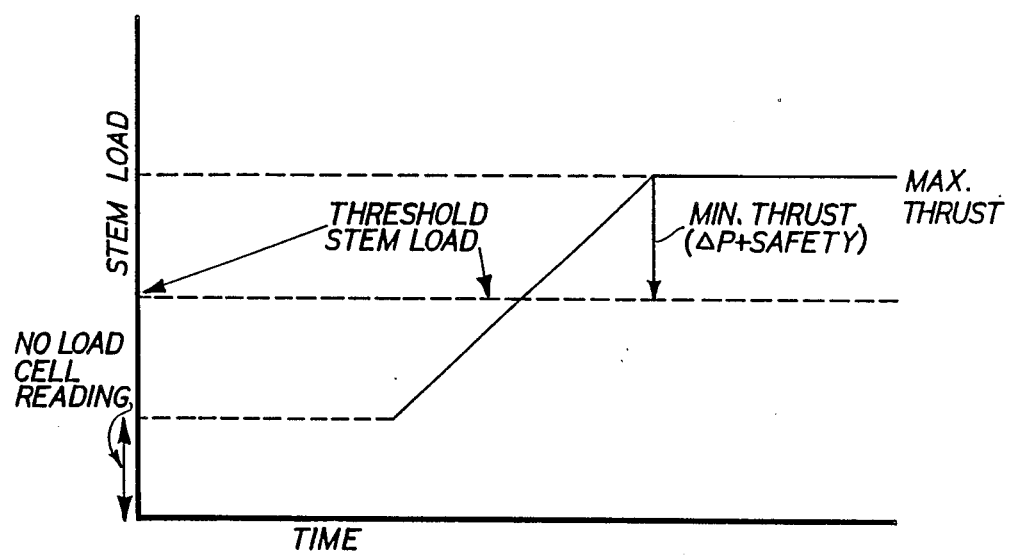
FIG. 7 is a graph displaying a stem load vs time curve and representing relationship of operator output thrusts.

A second method of using the Torque Factor in valve diagnostics is to calibrate the Torque Factor to the output thrust at the stem 24 of the valve operator 16, and to utilize the calibrated Torque Factor to ascertain the availability to the operator of the "minimum thrust". In accordance with this mentioned use of the present invention, a valve operator 16 is diagnosed as experiencing a malfunction when the output thrust available to the operator has reached an unacceptable low level. This unacceptable low level of available thrust is, for purposes of the present invention, defined as the "minimum thrust" which the user deems necessary for the valve operator 16 to properly open and close the valve 26. This minimum thrust value is typically calculated or otherwise determined by an engineer, power plant administrator, the user or other competent party. One method of determining the minimum thrust is to calculate the thrust required to overcome the maximum $\Delta P$ (pressure differential) of the valve and then increase that thrust by a margin of safety (i.e. 15%), using the resulting figure as the "minimum thrust". In accordance with the present invention, a "threshold Value" of output thrust is determined which represents the greatest thrust level which the user will tolerate to build up within the operator prior to the time that the valve 26 has fully opened or fully closed. The relationship between maximum thrust (i.e. at torque switch trip or motor contact drop out), minimum thrust ($\Delta P$+safety margin) and threshold is shown on the sample stem load/time trace of FIG. 7 and the line-chart of FIG. 7A. It is seen that, if the operator 16 Running Thrust is in excess of the Threshold Value of thrust, the operator will not have available the determined "minimum thrust" to seat the valve 26. The Running Thrust is defined for purposes hereof as the amount of output thrust generated by the operator 16 while moving the valve stem 24 (and valve 26) from open-to-close, prior to the transient state of valve seating; and also the thrust generated while moving the valve 26 from close-to-open, after the transient state of unseating. To determine the threshold output thrust, with reference to FIG. 7, subtract the "minimum thrust" from the maximum thrust. For methods of determining maximum thrust, see below.

Figure 8:
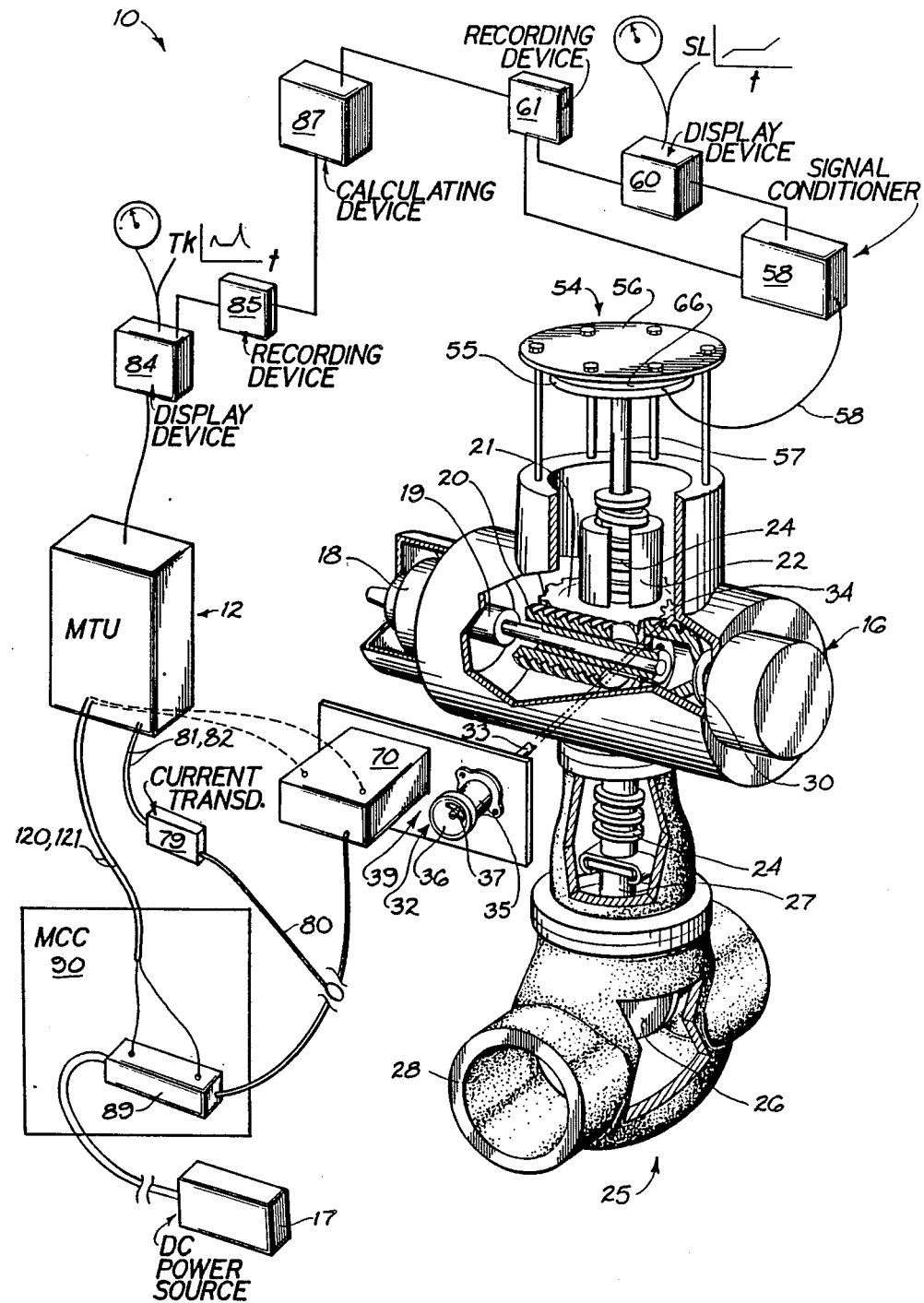
FIG. 8 is a pictorial representation, with parts broken away and parts isolated, of the DC motor operated valve remote monitoring system in accordance with the present invention, depicting an alternate embodiment of FIG. 1, and showing local calibration embodiment of the calibration mode.

In accordance with one embodiment of the present invention, calibration of Torque Factor to the output thrust is accomplished, with the assistance of added equipment temporarily connected to the valve operator, as depicted in FIG. 8. This embodiment which utilizes the equipment of FIG. 8 is termed as the "Local Calibration" embodiment since calibration is accomplished by direct, local access to the valve operator 16. With reference to FIG. 8, the apparatus of the Local Calibration embodiment includes the DC Motor Torque unit 12, display device 84 and/or recording device 85 as already discussed above, as well as load measuring device 54. Whereas various load measuring devices may be utilized, the load measuring device 54 disclosed in the embodiment of the drawings is in the form of a stem load measuring device as disclosed in the Charbonneau U.S. Pat. No. 4,542,649. U.S. Pat. No. 4,542,649 is, by this reference, made a part hereof and operation of the stem load measuring device 54 is as described therein. The stem load measuring device 54 comprises a load cell 55 mounted to the bottom of a blocking plate 56. Resting on top of the valve stem 24, in communication with the valve stem 24 and the lower surface of the load cell 54, is a valve stem extension 57. The output signal of the load cell 55 is directed by signal cable 58 to a signal conditioner 59 and then to a display device 60 and/or recording device 61. The signal conditioner 59 provides a conditioned power supply for the load cell 55 and provides necessary subcomponents for generating and delivering the output signal to a display device 60, such as an oscilloscope, meter or other such device 63.

The method of determining availability of the minimum thrust using the Local Calibration embodiment is as follows:

1. Maximum Thrust, is determined by any acceptable method known in the industry. It is recommended and preferred that a value of maximum thrust, corresponding to the stem load at torque switch trip, be determined in accordance with methods of the Charbonneau et al U.S. Pat. No. 4,542,649.

2. The user determines the value of the "minumum thrust" and the Threshold Value of thrust, as discussed above.

Figure 9:
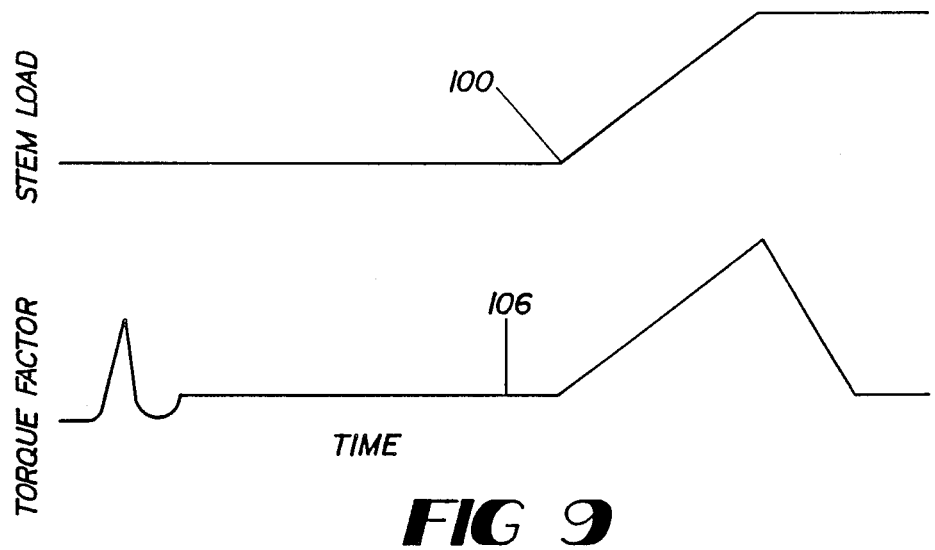
FIG. 9 is a graph displaying a stem load vs time curve and a motor torque factor vs time curve generated in accordance with the embodiment of FIG. 6 of the present invention.

3. The valve operator is outfitted with the system apparatus of the present invention in the manner described above in relation to FIG. 8. With the system apparatus 10 outfitted as per FIG. 8, the system is in the calibration mode. Calibration of the remote monitoring system 10 of the present invention in the Local Calibration embodiment is accomplished as follows:

a. The valve operator motor 18 is turned on and the operator 16 is set to open the valve gate 26. With the operator in this open-valve mode, the driven valve stem 24 begins to move upward pushing against the valve stem extension 57 and into the load cell 55. Movement is blocked by blocking plate 56.

b. Using the Load Cell 55 and plate 56 of the load measuring device 54, the user simulates a load on the value stem 24. The simulated load is measured at the load cell 55. The force signal generated at the load measuring device 54 is conveyed to the signal conditioner 59. The output signal is read by the user at the display device 60 in the form of a meter reading or a generated trace such as a stem load/time trace and then, preferably, recorded at recorder 61. An example of a load/time trace representing the simulated load is shown as trace 100 in FIG. 9. The load which is simulated by the load cell 55 and blocking plate 56 is a rapidly increasing stem load which simulates seating of the valve or some other condition which imparts a rapid rise in load to the valve operator 16. The imposition of this increasing, simulated stem load is typically halted by normal operation of the operator torque switch which trips to shut off the motor 18. For purposes of this disclosure, any such rapidly increasing load experienced by the operator, whether simulated or occurring during valve-in-use operation, is referred to as "Transient Load" and the period of duration of Transient Load is "Transient State". An example of a Transient State occurring during valve-in-use operation is the period of seating of the valve in the valve seat during the closing stroke; another example is the period of unseating of the valve from the valve seat during the opening stroke.

c. The motor torque unit 12 is connected (or was previously connected) to the operator terminal 70 and to the current transducer 79 as previously described. The output of the motor torque unit 12 is provided though display device 84, in the form of a meter reading, Torque Factor/time curve or other user observable manner and then, preferrably, recorded at recorder 85. An example of Torque Factor/time trace taken in accordance with the present invention is seen as trace 106 in FIG. 6 and 9. In preferred application, the display devices 60, 84 and the recording devices 61, 85 are all in the form of a single multi-purpose device, such as the recording oscilloscope known as the NICOLET 3091.

d. The load cell 55 measurements (resulting in the time trace 100 of FIG. 9) and the Torque Factor measurements (resulting in the time trace 106 of FIG. 9) are taken and are related in the manner of "when stem load reads y, Torque factor reads x". This relationship of actual stem load measured at the load cell 55 to Torque Factor readings provides directly usable data for ascertaining the stem load of the valve operator 16 during valve-in-use operation, for a given (measured) Torque Factor, during a Transient State of the valve operator.

e. It is an advantage of the present invention that the output Torque Factor of the D. C. motor 18, as represented by the DC Motor Torque Unit 12 in accordance with the present invention, is linearly related to the stem load. It is preferred, when determining the correlation between the Torque Factor and stem load, that an elastic element 66 (such as a bellville washer or rubber washer) is used in conjunction with the load cell 55 to cushion initial impact of the valve stem extension 57 at the loadcell. In such a preferred application the Torque Factor measurements from the present invention Motor Torque Unit 12 correspond in time to the related stem loads. Thus, once the correlation between the stem load curve and the Torque Factor curve is determined, during the Transient State, a Conversion Factor ("z") is ascertained such that Tk (z)=stem load. In accordance with the present invention, this same Conversion Factor ("z") also reflects the correlation between stem load and Torque Factor throughout the valve operation cycle. The Torque Factor is now calibrated to the stem load.

4. Through the above described calibration steps, the user has now determined a Conversion Factor (z) for the respective valve operator 16 and motor 18, in accordance with the Local Calibration embodiment of the present invention. From this point on, the Torque Factor for the respective valve operator has been correlated to the stem load and the stem load can now be deduced from measurements taken only of the Torque factor Knowing the Conversion Factor, a Threshold Value for Torque Factor is calculated by dividing the Threshold Value for thrust load (see FIG. 7) by the Conversion Factor. Or, conversely, the stem load and thus the thrust generated by the operator 16 is deduced from measurements of the Torque Factor by multiplying the Torque Factor by the Conversion Factor.

5. The valve operator 16 is returned to service by removal of the load measuring device 54. The system apparatus 10 of the present invention is now no longer in the calibration mode (see FIG. 8) but is now in the monitoring mode (see FIG. 1). In the monitoring mode, in accordance with the present invention, the DC motor Torque Unit 12 remains connected, preferably at the Master Control Center 90 in the non-instrusive manner discussed above, to the Master Control terminal 89. The output from the Motor Torque Unit 12 is conveyed by appropriate signal conveying cable to the display device 84, i.e. meter or oscilloscope.

Figure 6A:
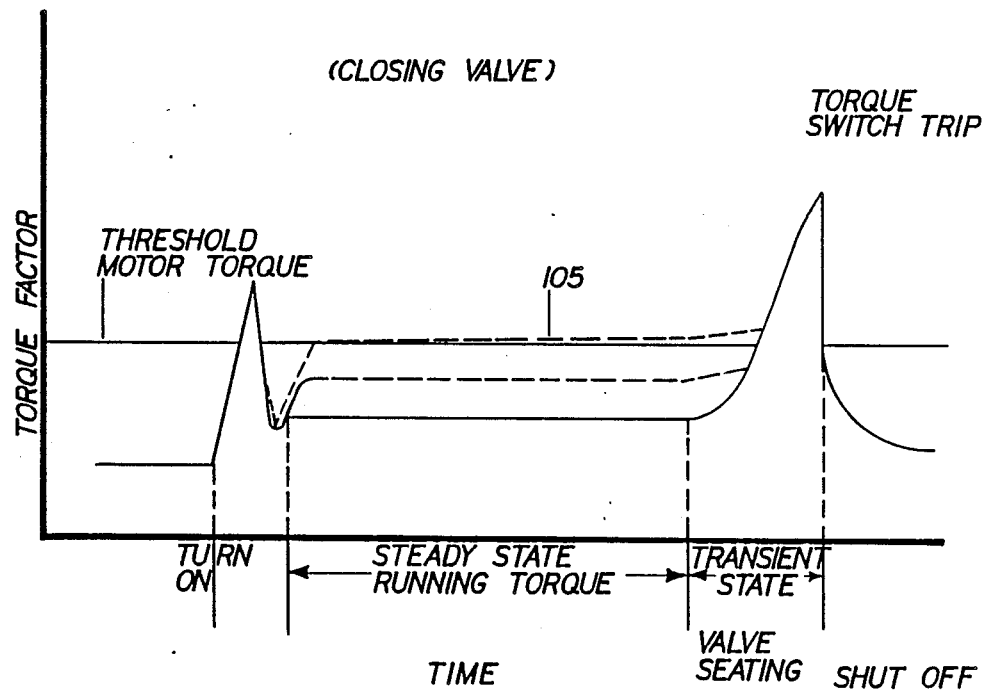

6. The user monitors the Torque Factor on a periodic basis at the master control center 90 or, in certain embodiments, at the valve operator 16. FIG. 6A shows examples of a plurality of Torque Factor traces acquired during valve-in-use operation of the valve operator 16 and valve 26, taken during monitoring.

7. When and if the actual value of the monitored Torque Factor is observed to equal or exceed the Threshold Value for Torque Factor (see trace 105 of FIG. 6A), the user is alerted, either by mental association or by physical alarm, that there is a possibility that the thrust now available to the operator is insufficient to successfully open or close the valve gate 26. At this point, the user should know to investigate the valve to determine if there is, indeed, a condition which requires repair, maintenance or replacement of the valve. Although a physical alarm is not a required component of the present invention, alternate embodiments of the invention include a buzzer alarm or other audible signal. In preferred embodiments, the recording device 85 located at the remote master control center 90 is a device which provides a printed, time related record of the monitored Torque Factor to allow for scanning by user of the Torque Factor condition over a period of time.

In accordance with another embodiment of the present invention, calibration of Torque Factor to the output thrust is accomplished through reliance upon manufacturer published values of "gear efficiency" and "stem factor" for the particular valve operator 16 being diagnosed. This embodiment shall be termed the "Remote Calibration embodiment". It is understood that this embodiment assumes that the published values of gear efficiency and stem factor, which are determined on new valves in ideal conditions, have reliability with respect to the tested valves; and, thus, it is realized that the results of this embodiment are subject to a degree of error. For purposes of this embodiment, it is assumed that the value of "k" can be taken. as that constant seen in FIG. 5 as 745.7/5252.1 (thus, K=0.142) in spite of other assumptions made above; and, thus, another degree of error will be experienced due to the mechanical rotational losses of the motor 18 (see FIG. 5) which are not considered by the motor torque unit 12 of the present invention nor typically considered by manufacturers published gear efficiency ratios. Nonetheless, this embodiment is considered, at least, to have value in critical situations where no access may be had to the valve operator at the time of testing (for example, in a "critical" area of a nuclear power plant). The method of this embodiment is accomplished totally removed from the valve operator, and at the Motor Control Center, hence the name "Remote Calibration embodiment".

Figure 10:
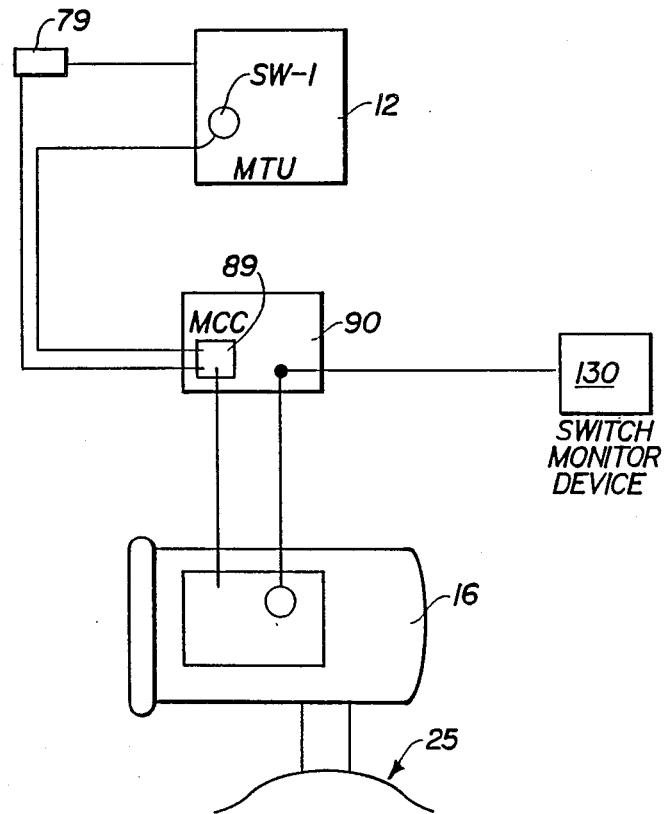
FIG. 10 is a schematic representation of the DC motor operated valve remote monitoring system of FIG. 1, showing the remote calibration embodiment of the calibration mode.

The method of determining availability of the minimum thrust using the Remote Calibration embodiment is as follows (with reference to FIG. 10):

1. The DC Motor Torque Unit 12 (with the current transducer 79) is connected to the master control terminal 89 at the MCC 90, as discussed previously.

2. The operating status (on or off) of the operating motor 18 is monitored at the MCC 90 by monitoring the motor contactor utilizing a known switch monitoring device 130, such as that disclosed in U.S. Pat. No. 4,672,310 to Sayed, performed in accordance with the manufacturer's (inventor's) specifications.

3. The user determines the value of "minimum thrust", as discussed above. Then, utilizing the manufacturer's published values of stem factor and gear efficiency ratios for the particular operator 16 being tested, the user converts the "minimum thrust" from output thrust value to an operator output torque value and then to an operator input torque value. This operator input torque value is then multiplied by the herein stated value of "k" to convert it to a Torque Factor value. This operator input torque factor value corresponding to the "minimum thrust" shall be called "Minimum Torque Factor".

4. The operator 16 is turned on to drive the valve 26 into the valve seat during which valve closing the Torque Factor is monitored by the DC Motor Torque Unit 12 and the position of the torque switch is monitored by the switch monitoring device 130. Both parameters are monitored over time and the value of the Torque Factor at motor cutoff is recorded. Since the value of Torque Factor corresponds to the Maximum Thrust at motor cutoff it is termed the "Maximum Torque Factor".

5. A Threshold Value for Torque Factor is now determined by subtracting the Minimum Torque Factor from the Maximum Torque Factor. It is acceptable here to lower the Threshold Torque Factor Value by some percentage (i.e. 10 or 15 or more) as an additional margin of safety in light of the expected degrees of error.

6. From now on, the user takes continuous or intermittant readings of the Torque Factor from the MCC 90. If the Torque Factor during running load (see FIG. 6) approaches the Threshold Torque Factor Value, the user is aware that the thrust available in the operator now (within a degree of error) may not be sufficient to open or close the valve 26 and marks the valve for immediate servicing.

7. Using the manufacturer's published values for gear efficiency ratio and stem factor and the herein stated constant "k", the user is also able the calculate (again, within a degree of error) the stem load, at any pointing time, from the monitored Torque factor.

Whereas this invention has been described in detail with particular reference to preferred embodiments thereof, it will be understood that variations and modifications can be effected within the spirit and scope of the invention, as described hereinbefore and as defined in the appended claims.

We claim:

1. Apparatus for monitoring the torque delivered by a DC electric motor which motor includes at least an armature shaft, and an armature within an armature circuit, said apparatus comprising:

voltage detecting means for detecting the voltage drop (Va) across the armature circuit;

current detecting means for detecting the current (Ia) supplied to the armature;

resistance detecting means for detecting armature circuit electrical resistance (Ra);

first analog circuit means for representing, at least, the function Ia(Va - IaRa) and for providing a representative output;

means for providing detected Ia, V4 and Ra as input to said first analog circuit means;

second analog circuit means for representing, at least, the function $$Sr \frac{[Va - IaRa]}{Vr - IrRa},$$

where Sr is the name plate rated speed of the motor, Vr is the name plate rated voltage of the motor and Ir is the name plate rated current of the motor and for providing a representative output;

means for providing detected Va, Ia and Ra as input to said second analog circuit means; and third analog circuit means for dividing said output from said first analog circuit means by said output from said second analog circuit means, and for providing a representative output;

whereby the resultant output of said third analog circuit means is a torque factor representative of the mechanical output torque delivered by the DC motor armature shaft multiplied by a constant.

2. Apparatus of claim 1, wherein said resistance detecting means comprises at least means for isolating the armature circuit resistance and means for representing said isolated resistance as a voltage.

3. Apparatus of claim 1, wherein said resistance detecting means comprises at least:
   a voltage source;
   variable resistance means for selectively creating various resistances within a circuit;
   a tuning circuit including therein, at least, said voltage source, said variable resistance means, and connecting means for connection to the armature circuit resistance, wherein said variable resistance means is varied to isolate a matching resistance which matches the armature circuit resistance;
   a resistance representing voltage supply circuit including, at least, voltage output terminals, said variable resistance means, and aid voltage source wherein the voltage drop across said voltage output terminals equals the voltage drop across said matching resistance of said variable resistance means, and
   switching means for selectively placing said variable resistance means first in said tuning circuit and then in said voltage supply circuit;
   whereby said armature circuit electrical resistance is isolated and then represented as a voltage for input to said analog circuit means.

4. Apparatus of claim 3, wherein said tuning circuit comprises a Wheatstone bridge.

5. Apparatus of claim 3, wherein said resistance detecting means further comprises, at least, first scaling means for assuring a representative voltage output at said voltage output terminals of said voltage supply circuit is in the ratio of 1 ohm of armature circuit resistance equals one millivolt voltage output.

6. Apparatus of claim 3, wherein said current detecting means includes, at least, means for representing said current supplied to the armature as a voltage for input to said analog circuit means.

7. Apparatus of claim 6, wherein said first analog circuit means further comprises, at least, brush loss circuit means for representing the function $[-2Ia]$, wherein said first analog circuit means represents the composite function:

$$Ia(Va-IaRa)-2Ia.$$

8. Apparatus of claim 3, wherein said first analog circuit means further comprises, at least, brush !loss circuit means for representing the function $[-2Ia]$, wherein said first analog circuit means represents the composite function:

$$Ia(Va-IaRa)-2Ia.$$

9. Apparatus of claim 1, wherein said second analog circuit means further comprises, at least, brush drop circuit means for subtracting a value of 4 volts from Va, wherein said second analog circuit means represents the composite function:

$$Sr \frac{[(Va-4)-IaRa]}{(Vr-IrRa)}.$$

10. Apparatus of claim 1, further comprising means for recording said output of said third analog circuit means.

11. Apparatus of claim 1, wherein said output (Vout) of said third analog circuit means defines a value of a Torque factor (Tf) representative of the mechanical output torque (T) generated by the DC motor armature shaft in the relationship Vout=Tf=Tk.

12. Apparatus of claim 11, wherein k=1/7.04.

13. Apparatus of claim 1, wherein said current detecting means includes, at least, means for representing said input current supplied to the motor as a voltage for input to said analog circuit means.

14. Apparatus of claim 1, wherein said value of Va is reduced within said second analog circuit means by a value representative of the voltage drop across the brushes.

15. Apparatus of claim 14, wherein said first analog circuit means further comprises, at least, brush loss circuit means for representing the function $[-2Ia]$, wherein said first analog circuit means represents the composite function:

$$Ia(Va-IaRa)-2Ia.$$

16. Apparatus for monitoring the torque delivered by a DC electric motor which motor includes at least an armature shaft and an armature within an armature circuit, of said apparatus comprising:
   power analog circuit means for representing at least a portion of mechanical output power of the armature by analog circuitry, and for providing a representative power output;
   speed analog circuit means for representing at least a portion of rotational speed of the armature by analog circuitry, and for providing a representative speed output; and
   third analog circuit means for combining said power output and said speed output to generate a torque factor,
   whereby the DC motor torque is monitored by monitoring the torque factor which is representative of the mechanical output torque delivered by the DC motor armature multiplied by a constant.

17. Apparatus of claim 16, wherein said power analog circuit means comprises, at least, circuit means for representing the function Ia(Va −IaRa) wherein Ia, Va and Ra are voltages representing, respectively, current supplied to the armature, voltage drop across the armature circuit and armature circuit electrical resistance; and wherein said speed analog circuit means comprises, at least, circuit means for representing the function $$Sr \frac{[Va-IaRa]}{(Vr-IrRa)},$$

wherein Sr, Vr and Ir are voltages representing, respectively, the name plate rated speed of the motor, the name plated rated voltage of the motor and the name plate rated current of the motor.

18. Apparatus of claim 17, wherein said power analog circuit means further comprises, at least, brush loss circuit means for representing the function $[-2Ia]$, wherein said power analog circuit means represents the composite function:

$$Ia(Va - IaRa) - 2Ia.$$

19. Apparatus of claim 18, wherein said value of Va is reduced within said second analog circuit means by a value representative of the voltage drop across the brushes.

20. Apparatus of claim 19, wherein said speed analog circuit means further comprises, at least, brush drop circuit means for subtracting a value of 4 volts from Va, wherein said speed analog circuit means represents the composite function:

$$Sr \frac{[(Va - 4) - IaRa]}{(Vr - IrRa)}.$$

21. Apparatus of claim 17, wherein said speed analog circuit means further comprises, at least, brush drop circuit means for subtracting a value of 4 volts from Va, wherein said speed analog circuit means represents the composite function of $$Sr \frac{(Va - 4) - IaRa}{(Vr - IrRa)}$$

22. Apparatus of claim 17, further comprising:
Va detecting means for detecting Va;
means for detecting said current supplied to the armature as a current and for representing said current as said Ia voltage;
means for detecting and isolating said armature circuit electrical resistance as a resistance and for representing said resistance as said Ra voltage.

23. Apparatus of claim 22, further comprising:
Va scaling means for scaling said Va voltage to a scaled value for input to said power and speed analog circuits;
Ia scaling means for scaling said Ia voltage to a scaled value for input to said power and speed analog circuits;
Ra scaling means for scaling aid Ra voltage to a scaled value for input to said power and speed analog circuits; and
means for providing said scaled values of Va, Ia and Ra to said power analog circuit and to said speed analog circuit.

24. Apparatus of claim 22, wherein said means for detecting and isolating said armature circuit electrical resistance as a resistance and for representing said resistance as said Ra voltage comprises, at least:
a voltage source;
variable resistance means for selectively creating various resistances within a circuit;
a tuning circuit including therein, at least, said voltage source, said variable resistance means, and connection means for connection to the armature circuit resistance, wherein said variable resistance means is varied to isolate a matching resistance which matches the armature circuit resistance;
a resistance representing voltage supply circuit including, at least, voltage output terminals, said variable resistance means, and said voltage source, wherein the voltage drop across said voltage output terminals equals the voltage drop across said matching resistance of said variable resistance means, and switching means for selectively placing said variable resistance means first in said tuning circuit and then in said voltage supply circuit,
whereby said armature circuit electrical resistance is isolated and then represented as a voltage for input to said analog circuit means.

25. Apparatus of claim 24, wherein said tuning circuit comprises a Wheatstone bridge.

26. Apparatus of claim 24, wherein said means for detecting and isolating said armature circuit electrical resistance as a resistance and for representing said resistance as said Ra voltage further comprises, at least, first scaling means for assuring a representative voltage output at said voltage output terminals of said voltage supply circuit is in the ratio of 1 ohm of armature circuit resistance equals one millivolt of voltage output.

27. Method of monitoring the torque delivered by a DC electric motor which motor includes at least an armature shaft and an armature within an armature circuit, said method comprising the steps of:
monitoring current (Ia) supplied to the armature, and voltage drop (Va) across the armature circuit, and armature circuit electrical resistance (Ra);
representing Ia and Ra as voltages;
representing, by analog circuitry, mathematical functions expressing at least a portion of the mechanical output power of the armature and at least a portion of the rotational speed of the armature;
providing the voltage representations of Va, Ra and Ia to the analog circuitry; and
generating a torque factor output from the analog circuitry, which torque factor is representative of the mechanical output torque delivered by the DC motor armature multiplied by a constant.

28. Method of claim 27, wherein said step of representing, by analog circuitry, mathematical functions, comprises, at least, the steps of:
representing mechanical output power by the function Ia(Va − IaRa); and representing rotational speed by the function:

$$Sr \frac{[Va - IaRa]}{(Vr - IrRa)}$$

wherein Sr, Vr, and Ir are voltages representing, respectively, the name plate rated speed of the motor, name plate rated voltage of the motor and name plate rated current of the motors.

29. Method of claim 28, further comprising the step of representing, by analog circuitry, the power loss across the motor brushes as a component of the function representing mechanical output power and the voltage drop across the motor brushes as a component of the function representing rotational speed of the armature.

30. Method of claim 28, further comprising the step of scaling monitored values of Va, Ia and Ra to scaled values thereof for input to the analog circuitry.

31. An apparatus, for representing the value of a target resistance as a voltage for use in an analog circuit, said apparatus comprising;
a voltage source;
variable resistance means for selectively placing varying resistances within a circuit;
a tuning circuit including therein, at least, said voltage source, said variable resistance means, and connection means for connection to the target resistance, wherein said variable resistance means is varied to isolate a matching resistance which matches the target resistance;

a resistance representing voltage supply circuit including, at least, voltage output terminals, said variable resistance means, and said voltage source, wherein the voltage drop across said voltage output terminals equals the voltage drop across said matching resistance of said variable resistance means, and switching means for selectively placing said variable resistance means first in said tuning circuit and then in said voltage supply circuit, whereby the target resistance is isolated and then represented as a voltage for input to an analog circuit.

32. Apparatus of claim 31, wherein said tuning circuit comprises a Wheatstone bridge.

33. Apparatus of claim 31 wherein said resistance detecting means further comprises, at least, first scaling means for assuring a representative voltage output at said voltage output terminals of said voltage supply circuit is in the ratio of 1 ohm of target resistance equals one millivolt of voltage output.

* * * * *